(12) United States Patent
Velev et al.

(10) Patent No.: US 8,379,599 B2
(45) Date of Patent: Feb. 19, 2013

(54) LOCAL MOBILITY ANCHOR RELOCATION AND ROUTE OPTIMIZATION DURING HANDOVER OF A MOBILE NODE TO ANOTHER NETWORK AREA

(75) Inventors: Genadi Velev, Langen (DE); Rolf Hakenberg, Langen (DE); Jens Bachmann, Langen (DE)

(73) Assignee: Panasonic Corporation, Osaka (JP)

( * ) Notice: Subject to any disclaimer, the term of this patent is extended or adjusted under 35 U.S.C. 154(b) by 768 days.

(21) Appl. No.: 12/519,120

(22) PCT Filed: Nov. 9, 2007

(86) PCT No.: PCT/EP2007/009734
§ 371 (c)(1),
(2), (4) Date: Sep. 4, 2009

(87) PCT Pub. No.: WO2008/071276
PCT Pub. Date: Jun. 19, 2008

(65) Prior Publication Data
US 2010/0027509 A1   Feb. 4, 2010

(30) Foreign Application Priority Data
Dec. 15, 2006  (EP) .................................. 06026071

(51) Int. Cl.
*H04W 4/00*  (2009.01)
*H04W 36/00* (2009.01)
(52) U.S. Cl. ......................... 370/331; 455/436
(58) Field of Classification Search .......... 370/331–334; 455/436–441
See application file for complete search history.

(56) References Cited

U.S. PATENT DOCUMENTS

| | | |
|---|---|---|
| 2004/0136348 A1 | 7/2004 | Han |
| 2006/0209891 A1 | 9/2006 | Yamada |
| 2007/0005971 A1* | 1/2007 | Leung et al. .................. 713/171 |
| 2008/0137625 A1 | 6/2008 | Hori |

FOREIGN PATENT DOCUMENTS

| | | |
|---|---|---|
| JP | 2004-080791 | 3/2004 |
| JP | 2005-267391 | 9/2005 |

(Continued)

OTHER PUBLICATIONS

International Search Report dated Aug. 2, 2008 w/ English translation.

(Continued)

*Primary Examiner* — Ronald Abelson
(74) *Attorney, Agent, or Firm* — Dickinson Wright PLLC

(57) ABSTRACT

The invention relates to a method for managing the mobility of a mobile node that moves to a different network, but keeps the same IP address. It is proposed to perform route optimization by a Proxy MIP agent on behalf of the MN, thereby shortening the data-path while allowing network-based mobility. At session setup with a correspondent node, the PCC system in the home network derides whether route optimization is to be performed for the communication session. The PMIPa requests relevant information for the route optimization, including the decision for route optimization and the addresses of MN and CN, from the PCC system in the home network, when the MN attaches to the new network area. Accordingly, route optimization is performed by using the Return Routability Procedure according to MIPv6, thereby applying the MN's IP address as Home Address, and the PMIPa's address as Care-of Address of the MN.

16 Claims, 7 Drawing Sheets

FOREIGN PATENT DOCUMENTS

| | | |
|---|---|---|
| JP | 2006-262379 | 9/2006 |
| WO | 2005/101788 | 10/2005 |
| WO | 2006/073084 | 7/2006 |

OTHER PUBLICATIONS

G. Giaretta, et al. "Network-based localized mobility management (NETLMM) with distributed anchor routers," IETF Standard-Working-Draft, Internet Engineering Task Force, IETF, CH, Oct. 14, 2005, pp. 1-39.

S. Gundavelli, et al., "Localized Mobility Management using Proxy Mobile IPv6," IETF Standard-Working-Draft, Internet Engineering Task Force, IETF, CH, Nov. 8, 2005, pp. 1-30.

C. Perkins, et al., "Route Optimization in Mobile IP," IETF Standard-Working-Draft, Internet Engineering Task Force, IETF, CH, vol. mobileip, No. 10, Nov. 15, 2000, pp. 1-25.

I. Akiyoshi, et al., "NETLMM Protocol," IETF Standard-Working-Draft, Internet Engineering Task Force, IETF, CH, Oct. 2005, pp. 1-15.

D. Johnson, et al., Request for Comments: 3775, Category: Standards Track, "Mobility Support in IPv6," Jun. 2004, pp. 1-155.

Notification of Reasons for Rejection dated Jul. 3, 2012, with English translation.

English translation of Decision of Rejection dated Sep. 18, 2012.

* cited by examiner

LOCAL MOBILITY ANCHOR RELOCATION AND ROUTE OPTIMIZATION DURING HANDOVER OF A MOBILE NODE TO ANOTHER NETWORK AREA

FIELD OF THE INVENTION

The invention relates to a handover procedure in which a proxy mobile IP agent in a foreign network performs route optimization for a mobile node, while the mobility and route optimization remains transparent to the mobile node. Furthermore, the invention also relates to a local mobility anchor and a policy control and charging system that participate in the handover procedure, for setting up an optimized route.

TECHNICAL BACKGROUND

Communications systems evolve more and more towards an Internet Protocol (IP)-based network. They typically consist of many interconnected networks, in which speech and data is transmitted from one terminal to another terminal in pieces, so-called packets. IP packets are routed to the destination by routers in a connection-less manner. Therefore, packets comprise IP header and payload information, whereby the header comprises among other things source and destination IP address.

For scalability reasons, an IP network uses a hierarchical addressing scheme. Hence, an IP address does not only identify the corresponding terminal, but additionally contains location information about this terminal. With additional information provided by routing protocols, routers in the network are able to identify the next router towards a specific destination.

When a terminal powers on, it configures an IP address that is based on the IP address prefix of the access network. If a terminal is mobile, a so-called mobile node (MN), and moves between subnets with different IP prefix addresses, it must change its IP address to a topological correct address due to the hierarchical addressing scheme. However, since connections on higher-layers such as TCP connections are defined with the IP addresses (and ports) of the communicating nodes, the connection to the active IP sessions breaks if one of the nodes changes its IP address, e.g. cue to movement.

Mobile IPv6—also denoted MIPv6—(see D. Johnson, C. Perkins, J. Arkko, "Mobility Support in IPv6", IETF RFC 3775, June 2004, available at http//www.ietf.org and incorporated herein by reference) is an IP-based mobility protocol that enables mobile nodes to move between subnets in a manner transparent for higher layers and applications, i.e. without breaking higher-layer connections. That is, the mobile nodes remain reachable while moving around in the IPv6 internet network. The main principle of MIPv6 is that a mobile node is always identified by its Home Address (HoA), regardless of its topological location in the internet, while a Care-of Address (CoA) of the mobile node provides information about the current topological location of the mobile node.

In more detail, a mobile node has two IP addresses configured: a Care-of Address and a Home Address. The mobile node's higher layers use the Home Address for communication with the communication partner (destination terminal), from now on called Correspondent Node (CN). This address does not change and serves the purpose of identification of the mobile node. Topologically, it belongs to the Home Network (HN) of the mobile node. In contrast, the Care-of Address changes on every movement resulting in a subnet change and is used as the locator for the routing infrastructure. Topologically, it belongs to the network the mobile node is currently visiting. One out of a set of Home Agents (HA) located on the home link maintains a mapping of the mobile node's Care-of Address to mobile node's Home Address and redirects incoming traffic for the mobile node to its current location. Reasons for deploying a set of home agents instead of a single home agent may be redundancy and toad balancing.

Mobile IPv6 currently defines two modes of operation: bi-directional tunneling (FIG. 1) and route optimization (FIG. 2). Using bidirectional tunneling, data packets sent by the correspondent node 101 and addressed to the home address of the mobile node 102 are intercepted by the home agent 111 in the home network 110 and tunneled to the Care-of Address of the mobile node 102, which is anchored at the foreign network 120. Data packets sent by the mobile node 102 are reverse tunneled to the home agent 111, which decapsulates the packets and sends them to the correspondent node 101. Reverse tunneling means that packets are transmitted by the mobile node via an additional reverse tunnel (to complement the "normal" one) that starts at the mobile node and terminates at the home agent.

For this operation in MIPv6, only the Home Agent 111 is informed about the Care-of Address of the mobile node 102. Therefore, the mobile node sends Binding Update (BU) messages to the Home Agent. These messages are sent over an IPsec security association, and thus are authenticated and integrity protected. A drawback is that if the mobile node is far away from the home network and the correspondent node is close to the mobile node, the communication path is unnecessarily long, resulting in inefficient routing and high packet delays.

The route optimization mode (see FIG. 2) can prevent the inefficiency of the bi-directional tunneling mode by utilizing the direct path between correspondent node and mobile node. When using route optimization, the mobile node sends binding update messages to the correspondent node, which then is able to directly send data packets to the mobile node (a type 2 routing header is used to send the packets destined to the mobile node's home address on the direct path to the mobile node's care-of address). Of course, the correspondent node has to implement Mobile IPv6 route optimization support.

More specifically, in order to perform route optimization, the mobile nodes and correspondent nodes exchange signaling messages, being part of the Mobility Header protocol, which is an extension header used by mobile nodes, correspondent nodes and home agents in all messaging related to the creation and management of bindings. With respect to route optimization, 4 message types are specified in the mobility header protocol.

FIG. 3 depicts the signaling flow performed for RO in MIPv6. The protection of Binding Updates sent to correspondent nodes does not require the configuration of security associations or the existence of an authentication infrastructure between the mobile nodes and correspondent nodes. Instead, a method called the Return Routability Procedure is used to assure that the right mobile node is sending the message.

The Return Routability Procedure enables the correspondent node to obtain some reasonable assurance that the mobile node is in fact addressable at its claimed Care-of Address as well as at its home address. Only with this assurance is the correspondent node able to accept Binding Updates from the mobile node which would then instruct the correspondent node to direct that mobile node's data traffic to its claimed Care-of Address.

This is done by testing whether packets addressed to the two claimed addresses are routed to the mobile node. The mobile node can pass the test only if it is able to supply proof that it received certain data (the "keygen tokens") which the correspondent node sends to those addresses. These data are combined by the mobile node into a binding management key. The integrity and authenticity of the Binding Updates messages to correspondent nodes is protected by using the binding management key.

The MN sends two messages to the CN, each however over a different route. One message—Home Test Init (HoTi) message—is sent to the HA over the MIP IP-in-IP tunnel, which in turn forwards the message to the CN. A mobile node sends a Home Test Init message to the correspondent node (via the home agent) to acquire the home keygen token. As apparent from FIG. 3 the message comprises the home init cookie that the CN must return later, and conveys the home address of the MN to the CN. The other message—Care-of Test Init (CoTi)—is sent directly to the CN in order to obtain the care-of keygen token. The CoTi message informs the CN about the current Care-of Address of the MN, and comprises the care-of-init cookie.

After receiving the HoTi and CoTi messages, the CN sends two messages back to the MN again over different routes. The Home Test (HoT) message is sent to the MN's HoA, i.e. to the HA in response to the HoTi message, The HA then forwards the message to the MN over the MIPv6 tunnel. Accordingly, the Care-of Test (CoT) message is sent directly to the MN. Both messages HoT and CoT respectively contain "home keygen token" and "care-of keygen token", respectively along with the home init cookie and the care-of-init cookie received from the previous HoTi and CoTi messages. Both tokens are based on CN's currently active secret key, nonces, and home or care-of address (respectively).

After the HoT and CoT messages arrive at the MN, the MN uses the keygen tokens and generates a binding management key from the tokens received with the HoT and CoT messages. After the mobile node has created the binding management key, it can supply a verifiable Binding Update to the correspondent node. After receiving the Binding Update message, the CN can update its binding cache with the binding of MN's HoA and CoA.

Thus, MIPv6 allows to optimize the route between the CN and the MN by allowing a mapping in the CN of the HoA and CoA of the MN, so that the both nodes can communicate directly.

One alternative to the MIPv6 approach for keeping the existing active IP sessions alive is to configure the serving access routers (AR) to advertise the same set of IP prefixes, so that the MN can keep using the IP addresses that have been configured at the old ARs. This approach is called network-based mobility management. One network-based mobility mechanism under standardization in IETF is "Network-based Localized Mobility Management" (NetLMM). One main characteristic of network-based mobility is that the MN is not involved in the mobility process, and thus, no signaling over the air interface is needed. The MIPv6 approach described in the previous paragraphs is known as host-based mobility because the MN is included in the mobility process, as the MN announces its CoA to the HA or CN, by sending Binding Update messages.

NetLMM defines two protocol entities, a Mobile Access Gateway (MAC) and a Local Mobility Anchor (LMA), and a set of messages between them. MAG is a router embedded in a device that terminates a specific link layer technology to which mobile nodes attach themselves. LMA is a router that terminates connections to multiple MAGs and handles mobility requests for mobile nodes moving within a NetLMM system. The data packets to/from the MNs are tunneled between the LMA and MAGs. When a MN moves from an old MAG to a new MAG, the LMA is notified about the location change and starts tunneling the MN's data packets to the new location (new MAG).

If the MN moves between two distinct NetLMM domains, the usual mobility solution would be MIPv6. Additionally, there are approaches to solve inter-NetLMM mobility (or mobility between local mobility anchors, i.e. inter-LMA mobility) by network-based mechanisms. One such approach is introduced by 3GPP for roaming scenarios, i.e. mobility between different operators. When a MN moves to a visited operator's network, the MN's data traffic is forwarded to the home operator's network, then the home operator routes the traffic to the visited operators network. One reason to have network-based mobility may be that the home operator wants to control the mobility, policy and charging of the MN's data traffic.

FIG. 4 shows an overview of a network architecture and a communication data route between the CN and MN, while the MN moves from operator 1 to operator 2. At the beginning the MN 102 registers in Access Network 1 110 (NetLMM area 110 is also the home network for the MN), and starts the communication with ON 101 via the serving LMA1 111. When the MN moves to AN2 120, it first registers and authenticates itself with the network. During the registration process, AN2 contacts AN1 to verify the identity of the MN. During the information exchange between AN1 and AN2, AN2 learns the IP prefix (and/or IP address) of the MN 102 and is thus enabled to hide the network layer mobility to the MN 102, by advertising the same IP prefix to the MN 102 via MAG3 122. That is, MN 102 still thinks that it is on the same IP subnet. For this purpose, the location of the MN 102 needs to be registered in LMA1 and LMA2. Further, tunnels between LMA1 and LMA2 and between LMA2 and MAG3 have to be set up in order to exchange the MN's traffic, The traffic from outside continues to arrive at LMA1 after the handover, because the MN continues to use the original IP address in the visited network which is anchored at LMA1. (The terms within the boxes correspond to the NetLMM terminology, and the terms in the parentheses correspond to 3GPP SAE terminology.)

As apparent from FIG. 4 the data route between the 101 CN and the MN 102, after the MN 102 moves to another access network, is unnecessarily long, especially in cases in which the CN 101 and the MN 102 are located topologically near. This results in inefficient routing and in high data packet delays, which is e.g. critical for real-time services.

SUMMARY OF THE INVENTION

In view of the above problems of the state of the art, one object of the invention is to propose an improved mechanism for handover of a mobile node while maintaining seamless communication with correspondent nodes.

The object is solved by the subject matter of the independent claims. Advantageous embodiments of the invention are subject-matters of the dependent claims.

According to the invention, a method for managing mobility of a mobile node is provided. The mobile node exchanges data packets with a correspondent node on a first data packet route via a first local mobility anchor in a first network area. After changing the connection of the mobile node from the first local mobility anchor to a second local mobility anchor, information on whether to use route optimization for the first data packet route between the correspondent node and the mobile node, and information on addresses of the correspondent node and the mobile node used for exchanging the data packets, are requested from a policy control entity in the first network area. In case route optimization is to be used for the first data packet route between the correspondent node and the mobile node, the correspondent node is instructed to exchange the data packets with the mobile node on a second data route via the second local mobility anchor.

According to an advantageous embodiment of the invention, the information on whether to use route optimization is a flag, which is easy to set or unset.

In a further embodiment of the invention the route optimization is performed by the second local mobility anchor on behalf of the mobile node. In this respect, an address of the second local mobility anchor is utilized as a Care-of Address of the mobile node, and an address of the mobile node is utilized as a Home Address of the mobile node, Thus, no signalling over the air is necessary as the mobile node does not participate in the route optimization signalling.

According to another embodiment of the invention, the second local mobility anchor requests the information and instructs the correspondent node. The route optimization and handover is thus handled advantageously by only one entity.

In a further embodiment of the invention the second local mobility anchor is located in a second network area. In addition, a second policy control entity in the second network area requests the information and is instructed by the second local mobility anchor to request same. Upon receiving the requested information in the second policy control entity, the requested information is forwarded to the second local mobility anchor.

According to an advantageous embodiment of the invention the policy control entity in the first network area decides whether to use route optimization for the first data packet route during or after the mobile node begins to exchange the data packets with the correspondent node. The policy control entity holds the necessary information to perform the decision and does not need to first request information in this respect.

Another embodiment of the invention relates to the first network being the home network of the mobile node, and the first local mobility anchor being the home agent of the mobile node.

In a further embodiment of the invention the second local mobility anchor receives data packets from the correspondent node on the second data packet route, wherein the data packets contain a routing header filed with an address of the mobile node. and the second local mobility anchor adapts a header of each data packet by including the address of the mobile node in the routing header field as the destination address of the data packet and by deleting the routing header field. The data packets may thus be routed to the mobile node by standard routers.

In a more specific embodiment of the invention, the second local mobility anchor receives data packets from the mobile node on the second data packet route. For each data packet, a header of the data packet is adapted by including an address of the second local mobility anchor as the source address of the data packet, and by including the address of the mobile node in an option field of the data packet. Accordingly, data packets thus adapted can be routed between the local mobility anchor and the correspondent node via standard routing protocols.

According to a different embodiment of the invention, the mobile node changes the connection from the second local mobility anchor to the first local mobility anchor, while the correspondent node exchanges the data packets with the mobile node on the second data route via the second local mobility anchor. Subsequently, after the connection of the mobile node to the first local mobility anchor is established, the second local mobility anchor is instructed by the first local mobility anchor to forward data packets incoming on the second data packet route to the first local mobility anchor for a predetermined time. Further, the correspondent node is instructed to exchange the data packets with the mobile node on the first data packet route via the first local mobility anchor. A seamless communication is enabled thereby.

In a further embodiment of the invention, the mobile node changes the connection from the second local mobility anchor to a third local mobility anchor in a third network area while the correspondent node exchanges the data packets with the mobile node on the second data route via the second local mobility anchor. After the connection of the mobile node to the third local mobility anchor is established, the second local mobility anchor is instructed by the first local mobility anchor to forward data packets incoming on the second data packet route to the first local mobility anchor for a predetermined time.

In addition, the correspondent node is instructed to exchange the data packets with the mobile node on the first data packet route via the first local mobility anchor. Thereafter, information on whether to use route optimization for the first data packet route between the correspondent node and the mobile node, and information on addresses of the correspondent node and the mobile node used for exchanging the data packets is requested from the policy control entity in the first network area. Then, in case route optimization is to be used for the first data packet route between the correspondent node and the mobile node, the correspondent node is instructed to exchange the data packets with the mobile node on a third data route via the third local mobility anchor. The route optimization for the third network area allows for a more direct route between the correspondent node and the mobile node, thus reducing data delays.

In a further embodiment of the invention the data packets incoming on the second packet data route from the CN contain a routing header field with an address of the mobile node. For each data packet, the second local mobility anchor adapts a header of the data packet by including the address of the mobile node in the routing header field as the destination address of the data packet and by deleting the routing header field, before forwarding the data packet to the first local mobility anchor.

According to another advantageous embodiment of the invention, in case route optimization is to be used for the first data packet route, it is determined whether the correspondent node is connected to the second local mobility anchor. In case the correspondent node is connected to the second local mobility anchor, the second local mobility anchor is instructed to exchange the data packets with the mobile node and the correspondent node on the second data route via the second local mobility anchor, instead of instructing the correspondent node to exchange the data packets with the mobile node on the second data route via the second local mobility anchor. In case the correspondent node is not connected to the second local mobility anchor, it is determined whether the correspondent node is located in the second network area.

The step of instructing the correspondent node to exchange the data packets with the mobile node on a second data route via the second local mobility anchor is performed in case the correspondent node is not located in the second network area. On the other hand, in case the correspondent node is located in the second network area, a third local mobility anchor is determined to which the correspondent node is connected in the second network area. Subsequently, upon determining the third local mobility anchor, the second and third local mobility anchors are instructed to exchange the data packets with the mobile node and the correspondent node on a third data packet route via the second and third local mobility anchors, instead of instructing the correspondent node to exchange the data packets with the mobile node on a second data route via the second local mobility anchor.

According to the invention a policy control entity in a first network area is proposed. A processor is adapted to decide whether to use route optimization for a first data packet route on which data packets are to be exchanged between a mobile node and a correspondent node. In addition, the decision is performed during or after establishing a connection of the mobile node to the correspondent node. Further, a receiver is adapted to receive a request from a network entity so as to request information about the decision for route optimization. A transmitter within the policy control entity is adapted to transmit the information about the decision for route optimization to the network entity.

According to an advantageous embodiment of the invention, the processor of the policy control entity is further adapted to establish at least one policy rule for the first data packet route. The processor is further adapted to include information about the decision for route optimization in the at least one policy rule for the first data packet route. One advantage may be that the decision about route optimization can be performed along with the usual decisions of the policy control entity.

According to the invention, a local mobility anchor for performing a route optimization is proposed. In particular, a mobile node exchanges data packets with a correspondent node on a first data packet route via a first local mobility anchor in a first network area. The connection of the mobile node is changed from the first local mobility anchor to the local mobility anchor. A processor in the local mobility anchor is adapted to generate a request message for a policy control entity in the first network area so as to request information on whether to use route optimization for the first data packet route between the correspondent node and the mobile node. In addition, information on addresses of the correspondent node and the mobile node used for exchanging the data packets is also requested thereby. A transmitter is adapted to transmit the request message to the policy control entity in the first network area after changing the connection of the mobile node from the first local mobility anchor to the local mobility anchor. A receiver is adapted to receive the requested information on whether to use route optimization and on addresses of the correspondent node and the mobile node, The processor is further adapted to generate an instruction notification for the correspondent node to exchange the data packets with the mobile node on a second data route via the local mobility anchor in case route optimization is to be used for the first data packet route between the correspondent node and the mobile node. Additionally, the transmitter is further adapted to transmit the instruction notification to the correspondent node.

According to an advantageous embodiment of the invention, the route optimization is performed by the local mobility anchor on behalf of the mobile node, by utilizing an address of the local mobility anchor as a Care-of Address of the mobile node, and by utilizing an address of the mobile node as a home address of the mobile node. Standard routines may be thus re-used, instead of implementing new protocol procedures.

In another embodiment of the invention, the receiver is further adapted to receive data packets from the correspondent node on the second data packet route, wherein the data packets contain a routing header field with an address of the mobile node. Also, the processor adapts a header of each received data packet by including the address of the mobile node in the routing header field as the destination address of each received data packet and by deleting the routing header field. Finally, the transmitter is further adapted to transmit each received data packet to the mobile node.

Another aspect relates to an advantageous embodiment of the invention wherein the receiver is further adapted to receive data packets from the mobile node on the second data packet route. Further, the processor adapts a header of each received data packet by including an address of the local mobility anchor as the source address of the data packet, and by including the address of the mobile node in an option field of the data packet.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
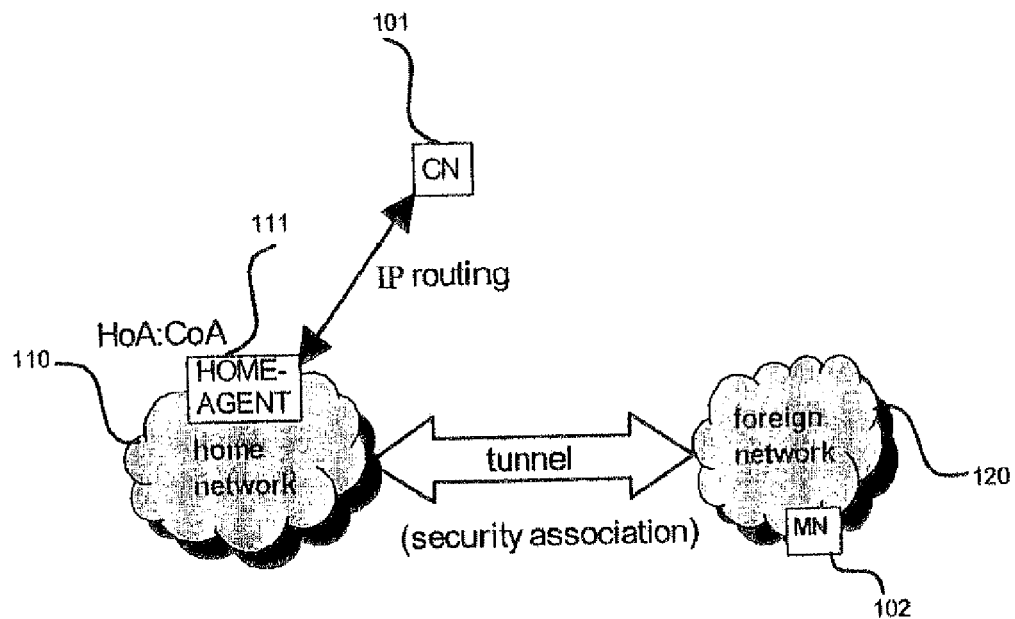
FIG. 1 exemplifies the use of bidirectional tunneling for a communication between a mobile node and a correspondent node according to MIPv6, FIG. 2 exemplifies the use of route optimization for a communication between a mobile node and a correspondent node according to MIPv6.

The following paragraphs will describe various embodiments of the invention. For exemplary purposes only, most of the embodiments are outlined in relation to a NetLMM communication system according to the NetLMM discussed in the Background Art section above. It should be noted that the invention may be advantageously used for example in connection with a mobile communication system such as the NetLMM communication system previously described, but the invention is not limited to its use in this particular exemplary communication network.

The explanations given in the Technical Background section above are intended to better understand the mostly NetLMM specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of theses architectures/systems.

DEFINITIONS

In the following a definition of several terms frequently used in this document will be provided.

A mobile node is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

A Local Mobility Anchor (LMA) is a router that controls a collection of host routes and associated forwarding information for mobile nodes within a localized mobility management domain (network area). Together with the MAGs associated with it, the LMA uses the NETLMM protocol to manage mobile node mobility within the localized mobility management domain. Routing of mobile node data traffic is anchored at the LMA as the mobile node moves around within the localized mobility management domain.

The policy control in general includes QoS control and/or gating control. The latter is the process of blocking or allowing packets, belonging to a service data flow, to pass through to the desired endpoint. Correspondingly, on the one hand a policy control entity allows operators to perform service based QoS policy, meaning the reservation and control of resources along the data path between a gateway and user terminal. On the other hand, the policy control entity determines the rules for filtering of data packets in the endpoints, i.e. in the gateway.

Generally, each network is identified by at least one or more numbers e.g. a so-called prefix. This number allows for routing of packets through the network to the identified network. Furthermore, this prefix number is contained in the addresses that can be used by the nodes in the network. For example in IPv6, the number of a network is the IPv6 prefix and the address in a network is the IPv6 address composed of the IPv6 prefix and an IPv6 host part. In different networks, for example in a home network and a foreign network, different addresses are used.

A home network (i.e., the home link) of a mobile node is typically identified by the location of the home agent at which the mobile node registers its Care-of Address(es) for a given Home Address of the mobile node. A Home Address is an address assigned to a mobile node, used as the permanent address of the mobile node. This address has the prefix of the mobile node's home network. A Care-of Address is an address associated with a mobile node while visiting a foreign network. The prefix of the Care-of Address is typically equal to the prefix of the visited network. A mobile node may have one or more Care-of Addresses simultaneously.

A home agent is a router or a functional entity providing a routing function on a mobile node's home network with which the mobile node registers its current care-of address (es). While the mobile node is away from home, the home agent may provide mobility service to the mobile node e.g. by intercepting packets on the home link destined to the mobile node's home address, encapsulating them, and tunneling them to one of or a some of the mobile node's registered care-of addressees).

Figure 2:
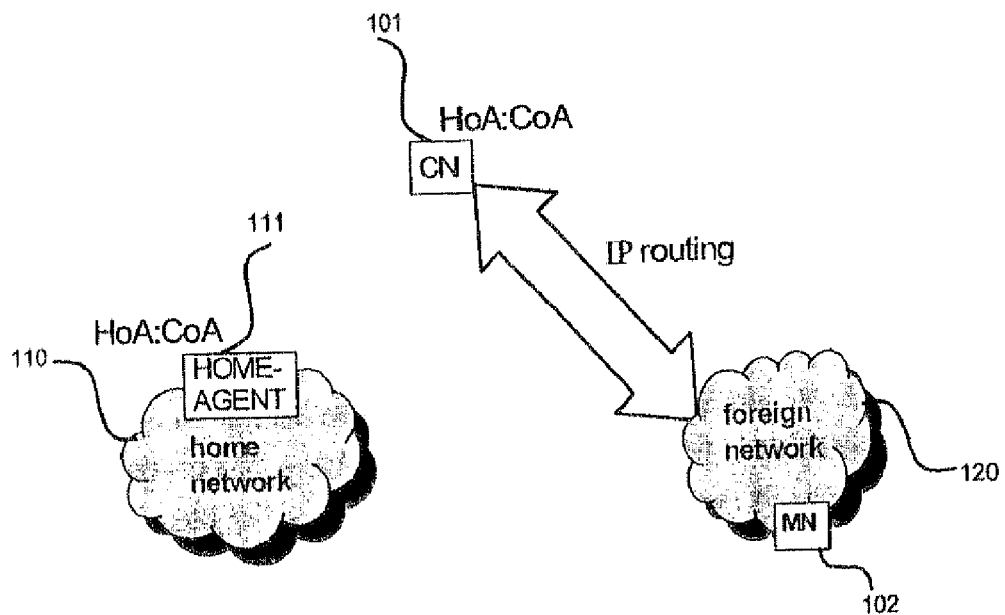
Figure 3:
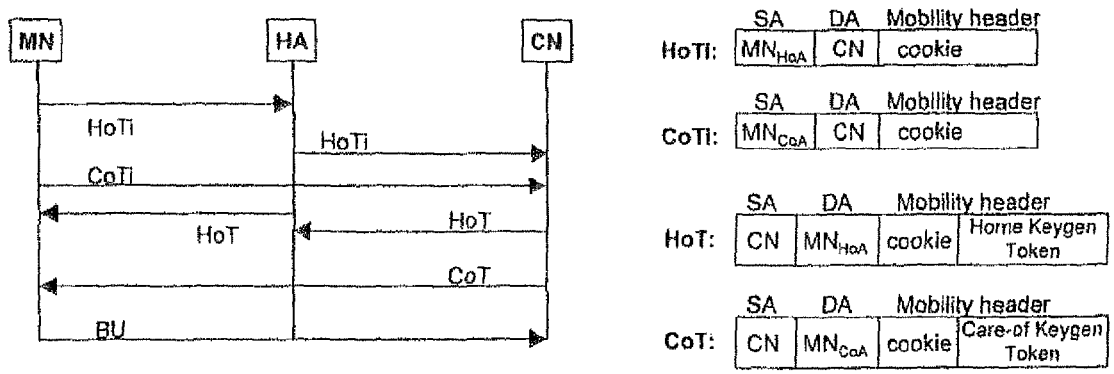
FIG. 3 shows a signal diagram for standard MIPv6 route optimization, along with the packet formats of the relevant messages.
Figure 4:
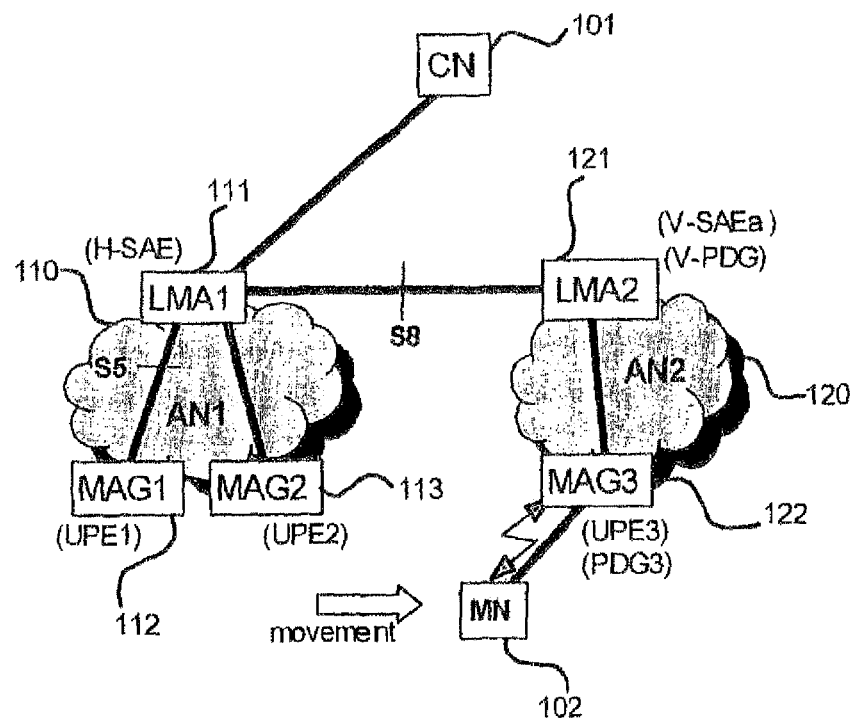
FIG. 4 illustrates the network architecture for a mobile node moving between different access networks.

One aspect of the invention is to optimize the routing between the CN and the MN, and thus avoid the routing via the local mobility anchor of the previous access network. However, as the MN in the new access network doesn't change its IP address, all data packets to the MN continue to arrive at the previous local mobility anchor. In addition, it is not possible to perform MIPv6 route optimization (see FIGS. 2 and 3), because the IP address of the MN remains the same.

Accordingly, another aspect of the invention relates to that the local mobility anchor of the visited foreign network initiates MIPv6 route optimization on behalf of the MN. In this respect, it is proposed to implement a proxy MIP agent (PMIPa) at the LMA of the new access network, wherein the corresponding protocol Proxy Mobile IPv6 (PMIPv6) is based on MIPv6 and provides network-based mobility management for a MN. It is assumed that the PMIPa is a function in the LMA. The PMIPa function would actually be responsible for sending/receiving MIPv6 messages containing a mobility header, such as BU, CoTi, HoTi etc., on behalf of the mobile node. Thus, the PMIPa is actually a control plane function/entity. PMIPa can update the databases and interact with other functions/modules in the data plane in the LMA. For example, if the PMIPa has performed route optimization with a ON for a given MN, the data plane in the LMA (e.g. the router functionality) would be instructed to modify the data packet header correspondingly and to forward the data packets.

In particular, once a mobile station enters its PMIPv6 network and performs the access authentication, the network will ensure the mobile station is always on its home network and further ensures it always gets its home address when using any of the address configuration procedures. In other words, there is home address/prefix that is specifically assigned for a mobile station and that prefix always follows the node, where ever it goes within that PMIP domain. From the perspective of the mobile station, the entire PMIP domain appears as a home link.

When the mobile station attaches to a link on the access router (AR) running the proxy mobile IP agent, the mobile node will present its identity to the network as part of the access authentication procedure. In particular, after a successful authentication based on Authentication, Authorization and Accounting (AAA) during the MN's link layer registration at the new AR, the PMIPa will have the mobile station's profile, including the IP address prefix (or home IP address) and the home agent of the MN. The proxy mobile IP agent will have enough information to ensure the mobile station is at its home link by sending Router Advertisements with parameters that are specified for the mobile station's home link. The proxy mobile IP agent sends a Proxy Binding Update message to the mobile station's home agent. The source address of that message will be the IPv6 address of the PMIPa. After validating the request and upon accepting this binding update request, the home agent sets up a tunnel with the source address of the tunnel fixed to its own address and the destination address of the proxy mobile IP agent, obtained from the Binding Update message.

The PMIPv6 may be compared to NetLMM as they target the same problem, and render the mobility to be transparent to the MN's network layer. Consequently, no signaling over the air interface is necessary to provide a seamless communication to a correspondent node while roaming between networks.

As already mentioned, the PMIPa, implemented in the LMA of the new access network, will conduct the route optimization according to MIPv6 for the MN. However, in order to perform the RO, the PMIP agent must hold information about the CN, HA of the MN and whether route optimization is to be performed at all. As the PMIPa is not provided with said information, it usually cannot initiate the RO on behalf of the MN.

Accordingly, one further aspect of the invention is to extend the Policy Control system in the home network in order to control the route optimization process when the MN performs a handover to another foreign mobility anchor. The Policy Control System holds the necessary information to allow the PMIPa to perform the RO for the MN.

In this respect, the policy control system will be described as far as it is necessary for the proper understanding of the invention. For the setup of service applications such as Voice-over-IP (VoIP), 3GPP has standardized the IP Multimedia Subsystem (IMS) architecture. An essential element of the IMS is the Call Session Control Function (CSCF), which applies multimedia service parameters to admit and reserve the resources over the transport network. The CSCF interacts with the Policy Control and Charging (PCC) system in order to admit and reserve the needed resources for the multimedia services.

Figure 5:
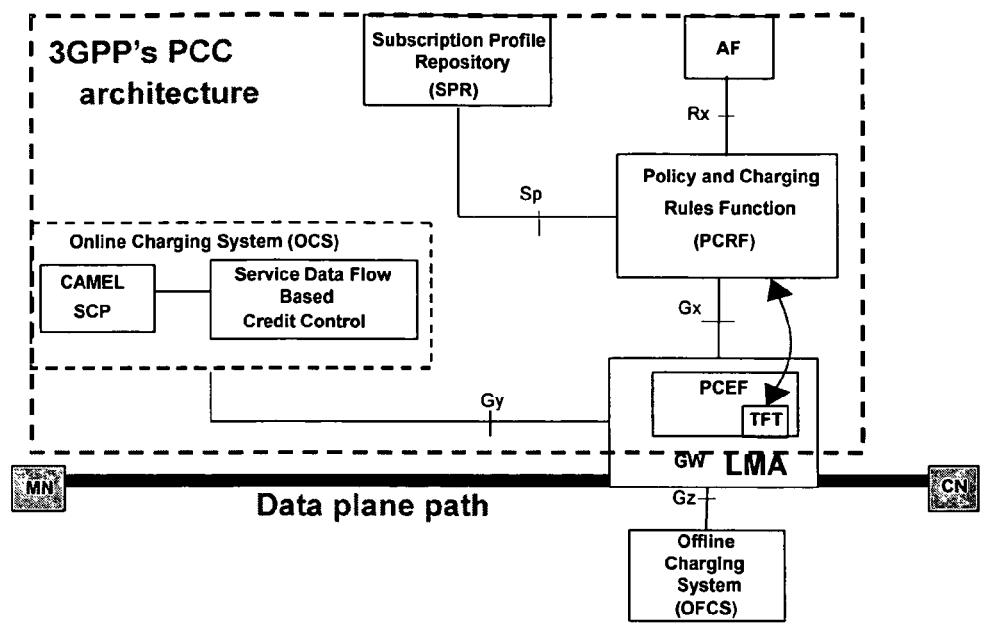
FIG. 5 shows the architecture of the Policy Control and Charging system according to the 3GPP standard.

FIG. 5 shows a high-level overview of the architecture of the Policy Control and Charging system according to 3GPP. The PCC functionality is comprised by the functions of the Policy and Charging Enforcement Function (PCEF), the Policy and Charging Rules Function (PCRF), the Application Function (AF), the Online Charging System (OCS), the Offline Charging System (OFCS) and the Subscription Profile Repository (SPR). The PCC architecture extends the architecture of an IP-CAN, where the Policy and Charging Enforcement Function is a functional entity in the Gateway node implementing the IP access to the Packet Data Network (PDN) (i.e. for GPRS the GGSN, and for WLAN the PDG).

In particular, the Application Function (e.g. can be the IMS's CSCF) triggers the network-based setup of bearers. The AF communicates with the PCRF to transfer dynamic session information, required for PCRF to take decisions about the traffic bearer setup. Such session information may be flow parameters based on Session Description Protocol (SDP) parameters of the multimedia service, which may contain IP 5-tuple parameters (Source Address, Destination Address, source/destination port, protocol ID).

The PCRF decides on the rules for treating the packet flow in the data plane. A PCC rule may be defined as a set of information enabling the detection of a service data flow and providing parameters for policy and charging control. To make a decision for a PCC rule the PCRF uses the following information:
 service information from the AF (e.g. SDP information or other available application information),
 subscriber information from the SPR to calculate the proper QoS authorization (QoS class identifier bitrate),
 the requested QoS from the PCEF, and
 its own pre-defined information.

Based on the PCC rules for one service data flow, the PCRF calculates the flow filter parameters and signals them to the PCEF, which may be e.g. located at the Gateway (e.g. LMA in the NetLMM case, GGSN in the GPRS case, and PDG in the WLAN case). The PCEF provides service data flow detection, user plane traffic handling, triggering control plane session management, QoS handling, and service data flow measurement as well as online and offline charging interactions.

Figure 6:
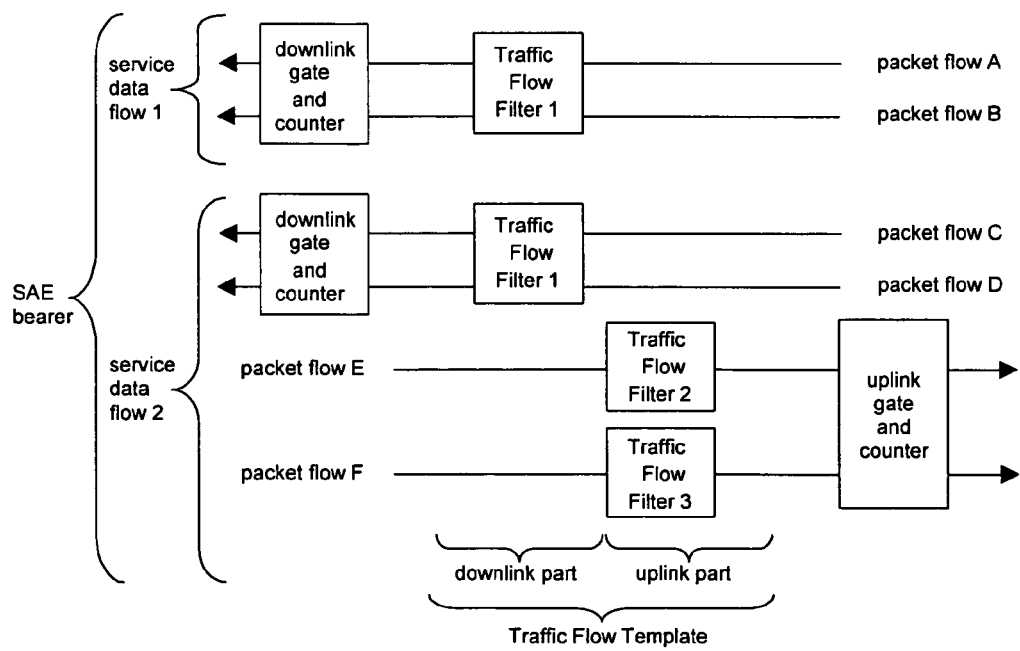
FIG. 6 illustrates the relationship between bearer, service data flow and packet data flow.

Furthermore, the PCEF uses a Service Data Flow Template (SDFT), which is applied for incoming packets to be mapped on the correct service data flow. FIG. 6 shows the relationship between bearer, service data flow and packet data flow, wherein several packet data flows may be aggregated in a service data flow. Additionally, several service data flows may be transmitted over one bearer. Each PCC rule contains a service data flow template, which defines the data for the service data flow detection and includes unidirectional service data flow filters for only one direction (downlink Traffic Flow Filter 1 of service data flow 1), or for both directions (downlink Traffic Flow Filter 1 and uplink Traffic Flow Filter 2 or 3 of service data flow 2). In addition, each PCC rule is defined per service data flow and may be dynamic (generated at PCRF) and/or predefined (directly provisioned into the PCEF).

The charging aspect of the PCC is not regarded in detail because it is of no essential relevance for the invention.

According to the aspect of the invention, the policy control entity holds the relevant information whether to use route optimization for the service data flow. The decision about route optimization is also performed at session setup between the mobile node and the correspondent node, along with the establishment of other PCC rules for the same service data flow.

In the following, the invention will be described in detail while referring to the figures.

Figure 7:
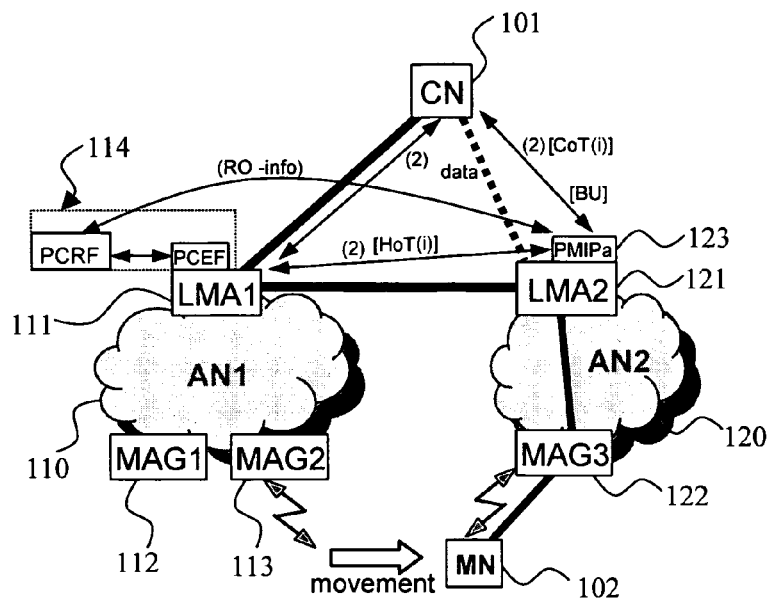
FIG. 7 shows the network architecture with two Access networks and illustrates the message exchange between the CN and the MN according to one embodiment of the invention.
Figure 8:
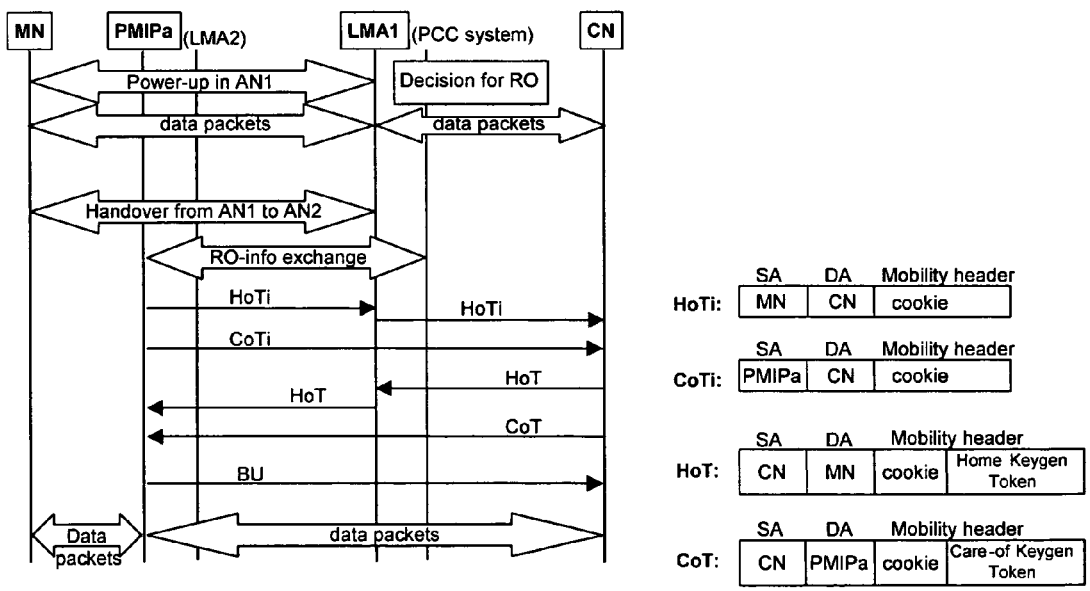
FIG. 8 is a signal diagram for illustrating the handover procedure according to one embodiment of the invention.

FIG. 7 shows an overview of a network architecture and part of the message exchange according to one embodiment of the invention. FIG. 8 shows a signal diagram for the handover procedure according to one embodiment of the invention.

As apparent from FIG. 7, it is assumed that the MN 102 is at first located in AN1 110, wherein AN1 is the home network for the MN, that is the network in which the MN registered its CoA. During the session setup when the MN 102 powers on in ANT1, the PCC system 114 performs routine procedures establishing the needed resources for the communication. This may include, the decision on PCC rules for treating the packet flows in the data plane, such as the mapping of data flow to available bearers or resource reservation for QoS.

According to one embodiment of the invention, the PCC system may further take the decision whether route optimization for a given data packet flow is needed based on different conditions. Some of the conditions may be:
 required by the Application Function (As AF may be part of the application management of e.g. IMS, it is possible that the AF may require route optimization for a roaming MN)
 Operator Policy
 Subscription information (from SPR)
 QoS parameters (end-to-end transmission delay)
 Charging requirements
 Location privacy (This means whether the MN wishes to hide its topological location, i.e. its IP address, from the CN, as the CN is able to resolve the MN's geographical location based on the IP address.)

For example, as the PCRF takes the decision on the PCC rules, it can also determine whether to perform route optimization based on a combination of several conditions from above. However, also other entities of the PCC system could be provided with the necessary information and then decide about RO for any given packet data flow. In this respect, the PCRF could use a RO flag in order to indicate whether a RO has been decided or not. However, other possibilities could also be pursued that would allow a display of the RO decision, e.g. a bit value. Accordingly, the RO flag is set as true, in cases the conditions suggest a RO. On the other hand, in cases in which no RO is desirable, the RO flag may be set false.

Below are several examples of how the decision about RO may be performed:
- If minimum end-to-end delay is required for the service AND charging rules allow that the traffic must not go through the home mobility anchor (H-LMA), than the PCRF may decide to RO flag as true.
- If the charging rule requires that the data packet flow needs to pass through the H-LMA, then the RO flag is not set (or set false).
- If location privacy is required, i.e. the new location of the MN should not be revealed to the CN, then the RO flag is not set (or set false/negative).
- If CN is located in the home network, then RO is not needed because the packets always pass through the home network, and thus the RO flag is not set (set false).

The above examples are only a very restricted extract of possible combinations of conditions, and should not be understood as limiting the way of deciding for or against RO.

The decision about route optimization is taken during the session establishment, that is during the setup of data packet flow parameters in the PCC rule. Once the RO decision is determined and setup in the PCC rule, it is valid for the duration of the communication session. However, it is also possible to dynamically change the RO-related information during the communication session. In particular, if e.g. the initial conditions change due to a variation of the End-to-End demands, it is possible for the PCC system (PCRF) to decide again whether RO shall still be performed, and to accordingly re-set the RO-flag if necessary.

In addition, the PMIPa 123 also needs to know the CN's IP destination address and the MN's source IP address, as the MN might have configured several different home IP addresses and use different IP address for communication with distinct CNs. Accordingly, it is necessary to provide the PMIPa with the source address—destination address pair (SA-DA) for the particular communication which is to be optimized.

It is also possible to only save the RO-flag in case no route optimization is to be performed, as the SA-DA pair is not necessary then Accordingly, in said case it would also suffice to transmit only the negative RO-flag to the PMIPa that requested the information, thereby reducing the length of the message.

There are several options for choosing an entity of the Policy Control system 114 where to store the RO flag along with the SA-DA pair, It is possible to do this in the PCRF, AF or PCEF entities (see FIG. 5). Advantageously, the RO-related information may be stored in the PCRF, because the PCRF takes the decisions about the PCC rules for the service data flow of the communication and thus may also take the decision about RO.

Additionally, it may retrieve information from other entities, e.g. PCEF, SPR, and based on this information is thus able to take a proper decision whether route optimization for the MN after roaming to another mobility anchor would be required. Nevertheless, the RO-related information (RO flag+ SA-DA pair) could be stored in the PCEF as well, e.g. as part of the SDFT (see below). The AF might also store the RO-related information, as it has information about the SA-DA pair and may have means to acquire the RO flag. The latter is possible in case that the IMS (or AF in particular) decides about the setup of RO flag.

The PCRF holds a PCC rule for each service data flow. The RO-related information may be incorporated for example into the PCC rule. There are several options how to store the RO-related information in the PCC rule:
- The RO-related information may be stored as a completely new section in the PCC rule for the particular service data flow. This new section (e.g. called "RO-related information") shall offer the possibility to have several parameters corresponding to each packet data flow within the service data flow (similar to the "Service data flow template").
- The RO-related information may be stored in the Policy control section of the PCC rule as a new parameter, which can be separately defined per packet data flow, if multiple flows are available per service data flow.
- The RO-related information may be stored in the "Service Data Flow Template" (SDFT). As described above, the SDFT may contain several Traffic Flow Filters for each packet data flow. Thus, similar to the Traffic Flow Filters, the RO-information shall be stored for each packet data flow.

It should be noted that the SDFT is part of a PCC rule and thus stored in the PCRF, but it is also stored in the PCEF. In particular, since PCRF and PCEF exchange the SDFT parameters as shown in FIG. 5, this results in having the same parameters stored in both entities.

In summary, at the beginning the MN 102 connects and registers to the AN1 110, as apparent from FIG. 8. Subsequently, it establishes a connection with the CN. This also includes the decision for PCC rules by the PCC system 114. As explained, thereby the decision whether route optimization is to be performed for the communication session to the CN 101 is taken by the PCC system 114. This decision may be taken by the PCRF or any other capable entity in the PCC system, wherein the resulting RO-relating information, composed of a RO-flag and the source address—destination address pair, is saved within the PCC system at any appropriate location. The MN 102 exchanges data packets with the CN 101 via the home link, in particular via LMA1 111 and MAG2 113 (MAG omitted in FIG. 8 due to illustration purposes, see FIG. 7).

Eventually, the MN 102 roams to a foreign network AN2 120, where it at first registers and authenticates itself with the network as part of the handover procedure. During the registration process, AN2 contacts AN1 to verify the identity of the MN. In particular, one option of performing the information exchange between AN1 and AN2 could be that the AAA client (Authentication, Authorization and Accounting) located in the MAs or LMAs in AN2 contacts the AM server in AN2. It the AM server of AN2 doesn't have information about the MN, it contacts the AM server in AN1. It is assumed that the AAA infrastructure is adapted to store and manage the information needed for network-based mobility. Consequently, the AM client in AN2 learns the IP prefix (and/or IP address) of the MN. Therefore, specifically the LMA2 121 and MAG3 122 are able to hide the network layer mobility from the MN, wherein the MN assumes that it is on the same IP subnet.

Accordingly, the location of the MN needs to be registered in LMA2 and LMA1, entailing the setup of a tunnel between LMA2 and LMA1, and between LMA2 and MAG3 so as to allow the exchange of data packets after the handover.

There are several ways how the RO-related information is obtained in the PMIPa, One possible way is that the PMIPa contacts the PCC system in AN1. After the handover into the new access network is completed including the establishment of tunnels between the two access networks, the PMIPa requests from the PCC system 114 in AN1 the RO-related information regarding the communication session with the ON. The PMIPa 123 may obtain the PCRF's address from LMA1 during the communication exchange with LMA1 at tunnel setup or any other signaling during handover procedure, or alternatively it may be pre-configured by the network operator. Thus, it is possible that the PMIP agent 123 directly contacts the PCC system in the MN's home network 110. In response, the PCRF entity would then tunnel the RO-related information to the PMIPa 123 in the LMA2 121.

In particular, the PMIPa obtains the RO-related information during the tunnel setup procedure with LMA1. PMIPa sends proxy BU message to HA (LMA1) and receives proxy BU Acknowledgement message including the RO-related information. The LMA1 may retrieve the RO-related information from the PCRF/PCEF when it receives the proxy BU message.

Other alternatives for requesting and signaling the RO-related information are possible. For example, the PMIPa 123 may contact its own PCRF entity (not shown), that is the PCC system in the visited network 120. Accordingly, the PCRF entity of AN2 contacts the PCRF entity in the home network to obtain the RO-related information. Subsequently, the PCRF in the foreign network 120 receives the requested information and may forward same to the PMIPa 123. Another alternative relates to the PCEF function at the visited network 120. In case the PCEF function is available, the PMIPa 123 may instruct same to request the RO-related information from the PCRF function in the home network. Therefore, after receiving the information, the PCEF function in AN2 enforces the PMIP agent to perform route optimization or not.

Still different to the above, the PCRF entity in the home network may obtain the PMIP agent's address from the LMA1 during the handover procedure of the MN 102 from AN1 to AN2. Consequently, the PCRF entity in AN1 may initiate the RO-related information exchange with the PMIP agent of LMA2, as well. It might also be possible to only initiate the transmission of RO-related information from the PCRF-entity in case the PCRF has determined that RO shall be performed.

As a result, the PMIPa 123 now holds the necessary information about the CN and the MN to perform the route optimization. In case the received RO-flag is true, then the PMIPa actually starts the RO with the CN on behalf of the MN. The CN knows only the MN's HoA and the transport session is bound to this HoA. In order to optimize the route, the PMIPa needs to establish a binding in the CN of the HoA with a new CoA. However, the MN does not have a new address as the AN-mobility is transparent to the network layer of the MN. Since the MN itself doesn't have a new address, the PMIPa's address may be used as the new CoA of the MN.

According to an embodiment of the invention, the return routability procedure of MIPv6 is utilized for optimizing the route. Accordingly, the BU message of the return routability procedure must contain a HoA, which is equal to MN's original address, and a CoA, which is the new address. In this respect, the PMIPa uses the IP address of the MN as the Home Address and further uses e.g. its own address as the Care-of Address of the MN. Another option could be that the PMIPa generates a new IP address to use as CoA for the MN.

In particular, as apparent from FIG. 8, the PMIPa generates a HoTi message with the MN's IP address as source address and the CN's IP address as destination address. According to the usual procedure, the HoTi message also comprises the home-init cookie, The HoTi message is transmitted via the LMA1 of AN1 to the CN. Moreover, the PMIPa also generates a CoTi message, wherein the source address of same is the IP address of the PMIP agent, and the destination address is the IP address of the CN. The CoTi message contains the care-of-init cookie and is transmitted directly to the CN.

Subsequently, the CN receives both messages, HoTi and CoTi, and in response thereto respectively creates HoT and CoT messages. In accordance with the usual procedure, the HoT message interchanges the source and destination address of the received HoTi message, that is the source address of the HoT message is the IP address of the CN, and the destination address is the IP address of the MN. Furthermore, the HoT message includes the received home-init cookie and the generated home-keygen token, and is transmitted via the home agent, LMA1 to the CN, because the home address of the MN, used for HoT, is anchored at LMA1. Subsequently, HoT is forwarded by the home agent to PMIPa, which acts on behalf of the MN during the RO, and thus does not forward said message to the MN.

The CoT message includes the IP address of the CN as the source address, the IP address of the PMIPa as the destination address, and further comprises the care-of-init cookie, received with the CoTi message, and the created care-of Keygen token. The CoT message is directly transmitted to the PMIPa, as the PMIPa's address is used for the destination address.

After that the PMIPa receives the HoT and CoT messages, it is able to generate the Binding Update in order to map the IP address of the MN with its own IP address. The BU message is directly transmitted to the CN, which in reaction thereto updates its binding cache. Consequently, the CN sends the data packets intended for the MN directly to the CoA of the MN, which in fact is the IP address of the PMI Pa. The PMIPa in turn forwards the data packets to the MN via the LMA2.

As a consequence, the route for exchanging the data packets is optimized as the CN is able to directly transmit data to the AN2 without the detour via AN1, while allowing network-based MN mobility with no actual change of the IP address of the MN. Accordingly, though the MN itself is not aware of this, the MN also transmits the data packets directly to the CN, without using the home link.

However, the data packets exchanged between the CN and the PMIPa also include the Routing Header Option (R.H.O.), respectively the Home Address Option (H.A.O.), which is the standard MIP behavior. In particular, data packets sent by the CN to the PMIPa contain the MN's IP address within the R.H.O., whereas data packets originating from the MN arrive at the PMIPa and from that on must include the MN's IP address in the H.A.O. The PMIPa needs to implement functionality to modify the IP packet header in several ways, in order that the data packets are correctly forwarded in the network.

Figure 9:
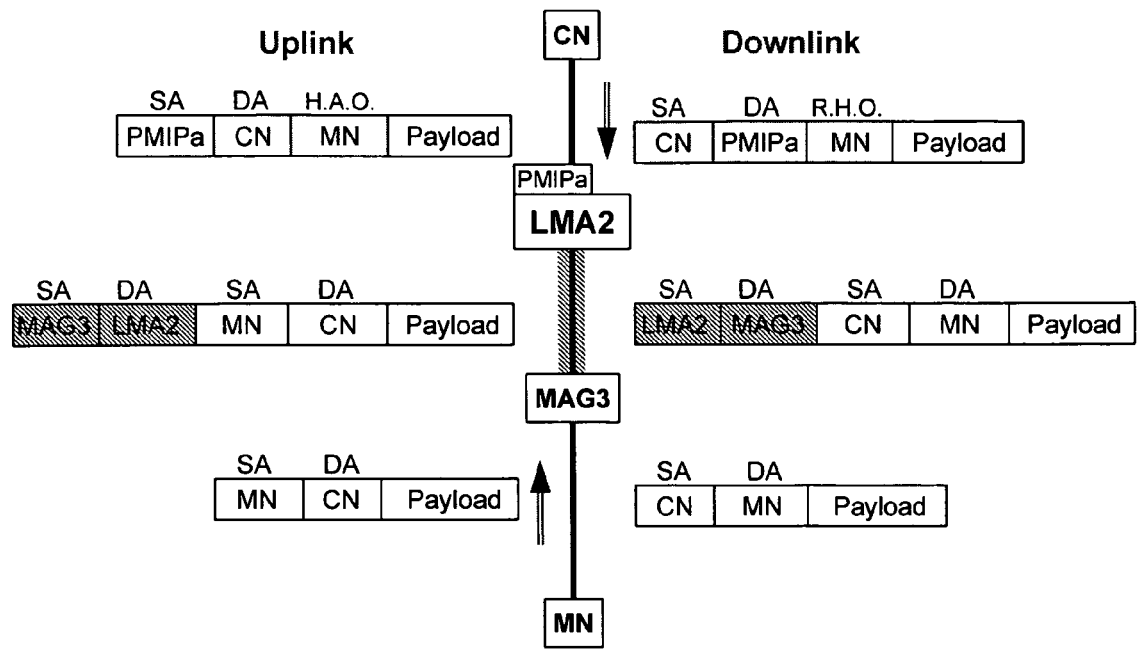
FIG. 9 shows the packet header modifications at LMA2, PMIPa and MAG3 during the exchange of data packets between the MN and the CN.

More specifically, FIG. 9 shows the data packet header modifications necessary for exchanging data packets after a handover according to one embodiment of the invention, so it appears to the MN as if there has not been a RO. The CN transmits data packets intended for the CoA of the MN, which actually is the IP address of the PMIPa. Furthermore, the data packets comprise the R.H.O. field with the IP address of the MN. The PIMPa receives the data packets and needs to exchange the PMIPa's IP address with the IP address in the R.H.O field, which is the MN's IP address, and further needs to delete the R.H.O field, Subsequently, the PMIPa forwards the data packets to the LMA2 which performs ordinary routing procedures, including the tunneling from the LMA2 to the MAG3 (source address: LMA2; destination address: MAG3). MAG3 in turn then forwards the data packets to the MN, according to the second inner header of the data packets.

On the other hand, data packets that originate from the MN arrive at first in the MAG3, which tunnels the data packets to the LMA2 (source address: MAG3; destination address: LMA2). The LMA2 is able to identify those packets that are destined to the correspondent node on that route that has been optimized by checking the destination and source address of each data packets. In addition, the LMA2 needs the information about which communication routes have been optimized previously. Consequently, for those data packets that are destined to the CN 101 the LMA2 (routing function of the data plane in LMA2) includes the IP address of the MN in the H.A.O. field. Further, the LMA2 (routing function of the data plane in LMA2) exchanges the MN's IP address in the source address field with its own IP address, and thus forwards the data packets in the direction of the CN. In this respect, there may be a synchronization between the PMIPa and the routing function. Both could share the same database with entries about the MN's LMA, MAGs, performed RO with CNs, etc. Further, the PMIPa may update this database each time the MN moves to another MAG, or after a route optimization has been performed or an existing route optimization is deleted.

In case the CN or the MN terminates the communication, it is important to inform all participating entities about the said termination. The PCC system, and more specifically the AF, is aware about the termination of the packet data flow between MN and CN, for which a route optimization has been performed. Unfortunately, the PMIPa in LMA2 of the foreign network cannot know about this termination. Whenever such termination occurs, any entity of the PCC system in the home network (e.g. the PCEF) informs the PMIPa about the termination of the MN-CN packet data flow. Consequently the PMIPa may send a BU message to the CN to delete the CN's binding cache entry for the MN. Further, since the data plane function in the LMA2 has states for modifying the data packet header to and from the MN, the PMIPa needs to delete these states too. Accordingly, all entities are thus informed and the termination of the communication session is finally completed.

Figure 10:
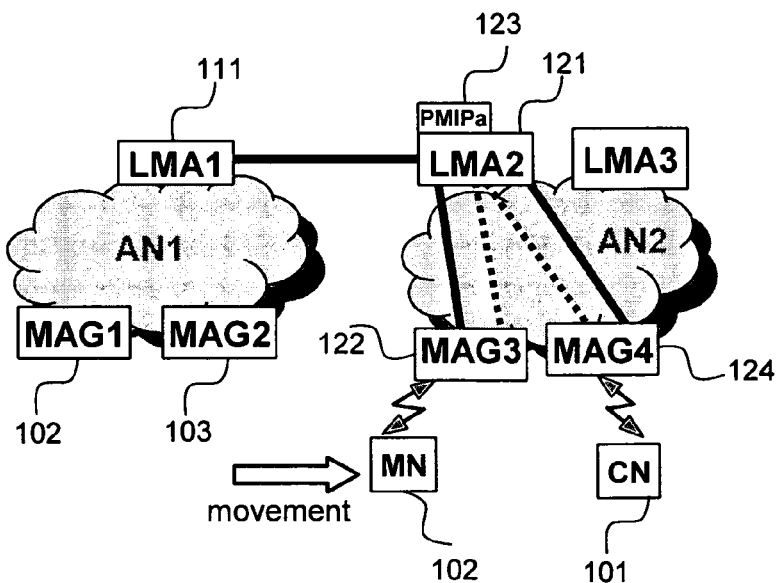
FIG. 10 shows a network architecture in which the MN and the CN are located in the same access network, and in addition are attached to the same local mobility anchor.

FIG. 10 shows a network architecture in which the correspondent node is connected to the AN2 to which the mobile node is moving. That is, the CN is located in the same foreign network as the MN after the handover. In this case it is possible to further improve the handover procedure according to the previous embodiments of the invention. In particular, two sub-cases are possible: the CN is anchored at the same local mobility anchor as the MN, or the CN is anchored at another local mobility anchor of AN2.

FIG. 10 shows the case in which the CN 101 is connected to the same local mobility anchor, namely LMA2 121 as the MN 102. Before optimizing the route according to the embodiment of the invention, the data packet route is unnecessarily long. Data is exchanged between MN and ON as follows: CN-MAG4-LMA2-LMA1-LMA2-MAG3-MN (see continuous lines). In order to optimize the route, the PMIPa 123 first requests the RO-related information from the PCC system of AN1. Under assumption that route optimization is to be used for the communication session of MN and CN, the PMIPa would receive a message with a positive RO-flag, and a SA-DA pair. In addition, before starting the actual route optimization according to the previous embodiments, the PMIPa 123 first checks whether the CN is served by the same LMA. This could be based on the CN's IP address prefix. If the address prefix is served by AN2, than there is a very high probability that the CN is located in AN2, except the CN has roamed to a foreign network. For example, the LMA2 may check the database with the nodes served by its own. If the CN is present in this database, this means the CN is anchored at the LMA2.

In case the CN 101 is anchored to LMA2, as illustrated in FIG. 10, the PMIPa does not start the route optimization according to the previous embodiments, but instead sets a host route for the MN and CN. That is, the packets arriving at LMA2 are just sent down to the MN or CN, respectively, and are not tunneled to LMA1 111 (see dashed lines).

Figure 11:
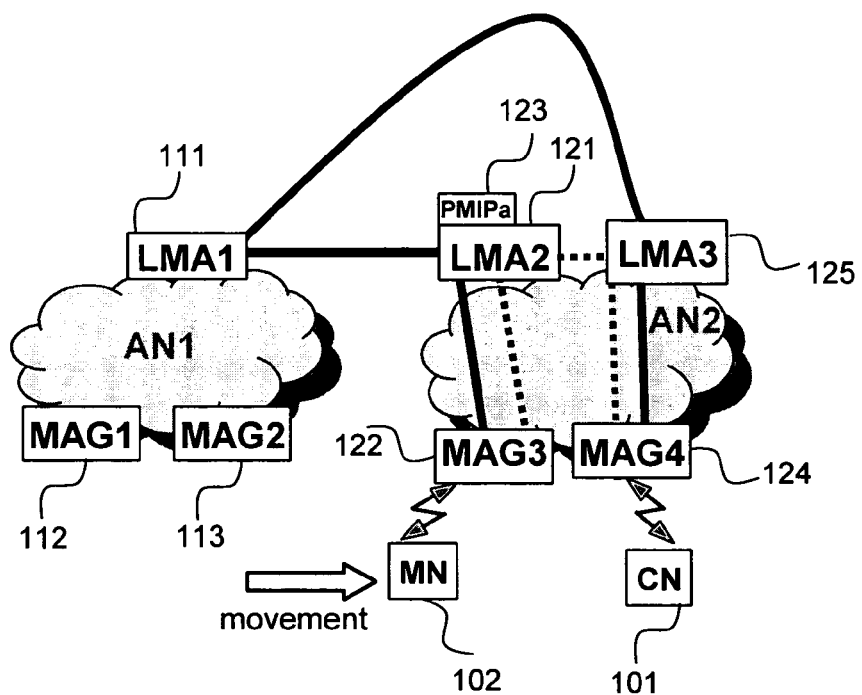
FIG. 11 illustrates a network architecture in which the MN and the CN are located in the same access network, but are served by different local mobility anchors.

In the other case, the ON is not connected to LMA2 but at a different LMA, namely LMA3 125, which is depicted in FIG. 11. Without optimizing the route, the data path length would be again quite long, in relation to topological proximity of CN and MN. Data packets would be exchanged as illustrated by the continuous lines from: CN-MAG4-LMA3-LMA1-LMA2-MAG3-MN.

After having requested information from the PCC system in AN1, whether the route is allowed to be optimized or not and after having negatively determined that the CN is not located at the same LMA as the MN, the PMIPa determines whether the CN is located in the same network area. The PMIPa is able to recognize this from the IP address of the CN received with the RO-related information, by comparing its IP prefix with that of the CN's IP address.

In case the CN is not located in the same network area, a previous embodiment of the invention may be carried out, according to FIGS. 7 and 8. However, in case the CN is in AN2 though not served by LMA2 (which has been previously determined), the PMIPa may poll other LMAs to discover the LMA, at which the CN is anchored, which is LMA3 125, as depicted in FIG. 11. A simple request with the MN's IP address may be transmitted to the other LMAs in the area, so that the other LMAs check whether they serve a MN with said IP address. Accordingly, LMA3 would respond positively. Upon learning the identity of LMA3, the PMIPa sets up a tunnel between LMA2 and LMA3 so as to forward data packets between CN and MN, After setting up this tunnel, data packets in both directions are forwarded directly between LMA2 and LMA3 through the tunnel (see dashed lines). Therefore, no route optimization according to the embodiments described above is necessary to shorten the data packet route.

In the above paragraphs only one movement of the mobile node to a foreign network and the corresponding route optimization have been considered. In the following, it will be illustrated how to further optimize the route after an additional movement of the mobile node to another network area. Again two cases are to be distinguished. For both cases it is assumed that a MN being registered at AN1 has moved to AN2, and is in communication with two correspondent nodes. Route optimization according to one embodiment of the invention has been performed to shorten the route from CN1 to MN without the detour through AN1 and LMA1. However, no route optimization has been conducted for the communication session with CN2. Consequently, CN2 103 communicates with MN 102 via LMA1 and LMA2, whereas data packets are exchanged directly between CN1 101 and MN 102 via LMA2 121 only.

Figure 12:
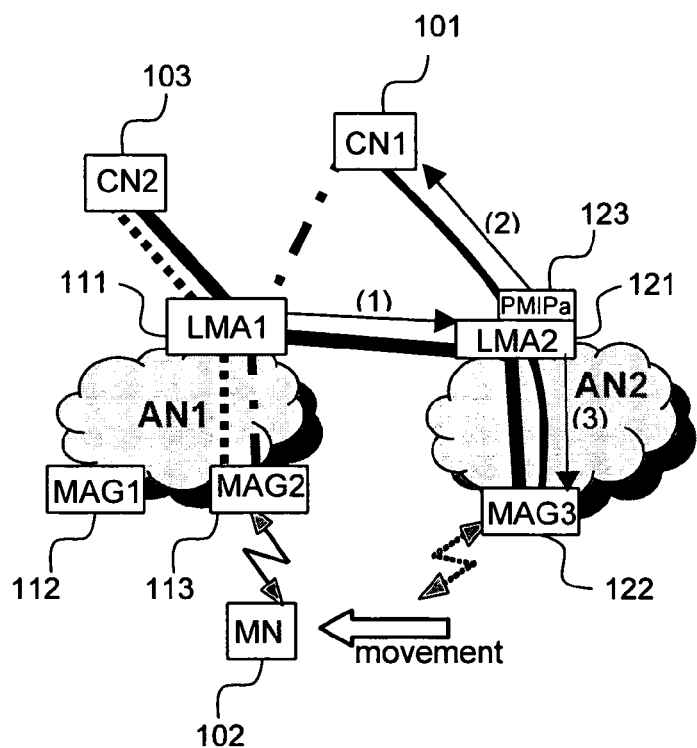
FIG. 12 illustrates a network architecture in which the MN moves from network area 2 back to the network area 1, after the handover procedure to network area 2 according to the invention has been conducted.

In the first case, it is assumed that the MN 102 moves back to AN1, the home network of the mobile node. This is illustrated in FIG. 12, which shows a network architecture with two network areas AN1 and AN2, in which the MN moves from AN2 back to AN1. The communication paths to CN1 and CN2 before the movement to AN1 are depicted with continuous lines. After moving from AN2 to AN1 only the communication with CN2 usually would still work, as the home agent (LMA1) is informed about the change and would forward incoming data packets from CN1 to the new topological location of the MN, which is AN1 (see dashed lines between CN2 and MAG2). However, CN2 usually is not informed about the change and would continue to transmit data packets to LMA2, this resulting in packet losses.

According to another embodiment of the invention, after the MN 102 attaches to LMA1's network, LMA1 sends a message (1) to LMA2 in order to deregister the MN. The LMA1 may have information about whether RO has been performed on this MN or not. Alternatively, LMA1 could request the necessary information from the PCC system in its network area as well. It is assumed that this deregistration procedure is a part of the network-based mobility (e.g. NetLMM), where the mobility anchor always sends deregistration messages to the old AR or MAG. Since in our case there is a hierarchy of anchors, it is assumed that LMA1 (upper level anchor) deregisters the MN in LMA2 (lower level anchor).

Advantageously, this message (1) further includes a timer value along with a forwarding rule. That is, the LMA2 is instructed thereby to forward incoming data packets from CN1 101 to LMA 111 for a predetermined time span. After this time span expires, the LMA2 deletes all information and entries about the MN. It is however necessary for the LMA2 to adapt those data packets according to FIG. 9, that have a R.H.O with the MN's UP address. Accordingly, LMA2 forwards the header-adapted data packets incoming from CN1 to LMA1 where the data is further routed to the MAG2 113 and MN 102. Subsequently, LMA2 transmits a binding update message (2) to the CN 101 in order to delete the binding cache entry between the MN's IP address and the PMIPa's IP address. It should be noted that according to MIPv6, the BU to delete a HoA-CoA binding in the CN must be sent by the same node, which has previously established the binding, i.e. the BU must be sent by the PMIPa (LMA2). Regarding to the performing of return routability, the binding cache entry HoA-CoA in the CN is valid for only a particular limetime. Therefore the PMIPa needs to perform return routability and sending adjacent BU before the lifetime expires. As long as the lifetime has not expired, the PMIPa can send BU for deleting the binding cache entry in the CN without performing return routability. After the lifetime elapses, the CN will automatically delete the binding cache entry. As a result the CN1 directly transmits the data to the MN's IP address which is anchored at the home agent LMA1. Further, LMA2 may also transmit a message (3) to MAG3 122 to delete the MN's state in MAG3. Upon transmitting these two messages (2), (3), the LMA2 may also return an acknowledgement to the LMA1 (not shown).

The data paths after the movement to AN1 and after the route optimization in case of CN1 are depicted by the dashed lines, respectively for CN1 and CN2.

Figure 13:
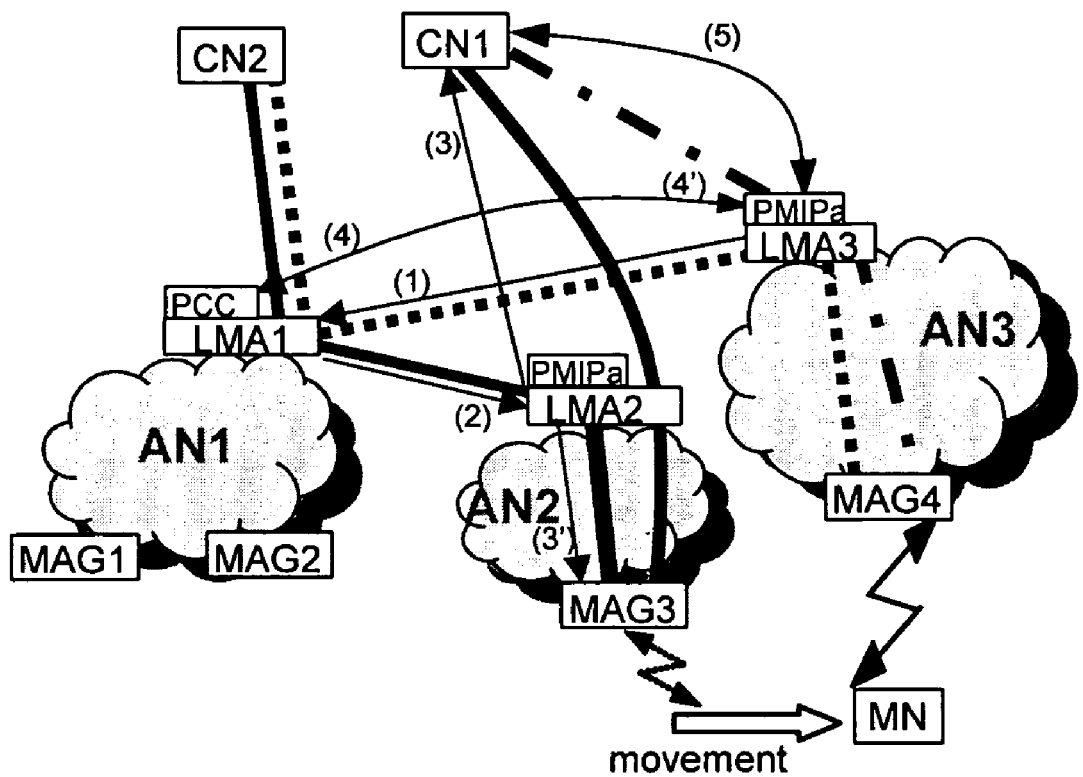
FIG. 13 illustrates a network architecture in the MN keeps moving to a network area 3, after the handover procedure to network area 2 according to the invention has been conducted.

FIG. 13 shows the case in which the MN further moves to another network area AN3 that is different to the home network. Same as with the previous case, the MN communicates with two correspondent nodes CN1 and CN2. After the MN attaches to the new network AN3 and to LMA3, LMA3 notifies (1) the home mobility anchor of the MN (LMA1) about the movement to AN3. Accordingly, LMA1 is now enabled to forward data packets directed to the home address of MN to the new Care-of Address of the MN in AN3. That is, communication data from CN2 is forwarded from LMA1 to LMA3 and from there to MN via MAG4 (see dashed lines), However, data from CN1 would again arrive at LMA2, this entailing data packet loss. In order to avoid this, similar to the embodiment in relation to FIG. 12, LMA1 now transmits a deregister message (2) to LMA2 in order to deregister the MN in LMA2. Again said message may advantageously include a time value and a routing instruction for LMA2. The routing instruction prompts the LMA2 to forward incoming traffic from CN1 to LMA1 for a predetermined time, defined by the received time value. Subsequently, LMA2 is further triggered to transmit a BU message (3) to the CN1 in order to delete the relevant binding cache entries between the address of the MN and the PMIPa. Additionally, the LMA2 may transmit a state deletion message (3') to MAG3 so as to delete the active states for the MN in MAG3. Resulting therefrom, CN1 transmits data packets to LMA1 which then forwards same to the MN via LMA3, similar to the traffic of CN2.

In the mean time, after the mobile node attaches to LMA3, PMIPa begins to perform a route optimization according to one embodiment of the invention. This may implicate for example that the PMIPa (or PCC system) in AN3 requests (4) from the PCC system in AN1 information about whether the communication sessions with CN1 and CN2 should be optimized in respect to its route or not. The PCC system is depicted as a function of LMA1, but it could be a separate entity in the home network as well. Accordingly, the PMIPa receives the requested information (4') and recognizes that only the data path with CN1 is to be optimized. As the PMIPa now holds the necessary information (RO-Flag+SA-DA pair) to perform the route optimization on behalf of the MN, the PMIPa generates the HoTi and CoTi messages (5), destined for the CN. In accordance with the embodiment described with FIG. 8, the HoTi and CoTi messages are generated by the PMIPa using its own address as the CoA of the MN, and the IP address of the MN as the HoA of the MN. As before, this results in HoT and CoT responses (5) from the CN1, and finally in a BU message (5) from the PMIPa in AN3 to the CN, so as to bind the IP address of the MN to the IP address of the PMIPa in AN3. Consequently, CN1 now starts to transmit the data directly to MN via LMA3, instead of making the detour via LMA1 (see dashed lines).

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the present invention may also be implemented by means of software modules which are executed by a processor or directly in hardware.

Also a combination of software modules and a hardware implementation may be possible. The software modules or instructions may be stored on any kind of computer readable storage media, for example RAM, EPROM, EEPROM, flash memory, registers, hard disks, CD-ROM, DVD, etc,

The invention claimed is:

1. A method for managing mobility of a mobile node exchanging data packets with a correspondent node on a first data packet route via a first local mobility anchor in a first network area, comprising the steps of:

after changing the connection of the mobile node from the first local mobility anchor to a second local mobility anchor, requesting from a policy control entity in the first network area information on whether to use route optimization for the first data packet route between the correspondent node and the mobile node, and information on addresses of the correspondent node and the mobile node used for exchanging the data packets, and in case route optimization is to be used for the first data packet route between the correspondent node and the mobile node, instructing the correspondent node to exchange the data packets with the mobile node on a second data route via the second local mobility anchor, wherein the steps of requesting information and instructing the correspondent node are performed by the second local mobility anchor.

2. The method of claim 1, wherein the information on whether to use route optimization is a flag.

3. The method of claim 1, wherein the route optimization is performed by the second local mobility anchor on behalf of the mobile node, by utilizing an address of the second local mobility anchor as a care-of address of the mobile node, and by utilizing an address of the mobile node as a home address of the mobile node.

4. The method of claim 1, wherein the second local mobility anchor is located in a second network area and wherein the step of requesting information is performed by a second policy control entity in the second network area, and the method further comprises the steps of:

instructing the second policy control entity by the second local mobility anchor to perform the step of requesting information;

upon receiving the requested information in the second policy control entity, forwarding the requested information to the second local mobility anchor.

5. The method of claim 1, wherein the policy control entity in the first network area decides whether to use route optimization for the first data packet route during or after the mobile node begins to exchange the data packets with the correspondent node.

6. The method of claim 1, wherein the first network is the home network of the mobile node, and the first local mobility anchor is the home agent of the mobile node.

7. The method of claim 1, comprising the steps of:

receiving in the second local mobility anchor data packets from the correspondent node on the second data packet route, wherein the data packets contain a routing header field with an address of the mobile node, for each data packet, adapting a header of the data packet by including the address of the mobile node in the routing header field as the destination address of the data packet and by deleting the routing header field.

8. The method of claim 1, comprising the steps of:

receiving in the second local mobility anchor data packets from the mobile node on the second data packet route, for each data packet, adapting a header of the data packet by including an address of the second local mobility anchor as the source address of the data packet, and by including the address of the mobile node in an option field of the data packet header.

9. The method of claim 1, while the correspondent node exchanges the data packets with the mobile node on the second data route via the second local mobility anchor, the mobile node changes the connection from the second local mobility anchor to the first local mobility anchor, the method further comprising the steps of:

after the connection of the mobile node to the first local mobility anchor is established, instructing the second local mobility anchor by the first local mobility anchor to forward data packets incoming on the second data packet route to the first local mobility anchor for a predetermined time, instructing the correspondent node to exchange the data packets with the mobile node on the first data packet route via the first local mobility anchor.

10. The method of claim 1, while the correspondent node exchanges the data packets with the mobile node on the second data route via the second local mobility anchor, the mobile node changes the connection from the second local mobility anchor to a third local mobility anchor in a third network area, the method further comprising the steps of:

after the connection of the mobile node to the third local mobility anchor is established, instructing the second local mobility anchor by the first local mobility anchor to forward data packets incoming on the second data packet route to the first local mobility anchor for a predetermined time, and instructing the correspondent node to exchange the data packets with the mobile node on the first data packet route via the first local mobility anchor, requesting from the policy control entity in the first network area information on whether to use route optimization for the first data packet route between the correspondent node and the mobile node, and information on addresses of the correspondent node and the mobile node used for exchanging the data packets, in case route optimization is to be used for the first data packet route between the correspondent node and the mobile node, instructing the correspondent node to exchange the data packets with the mobile node on a third data route via the third local mobility anchor.

11. The method of claim 9, wherein the data packets incoming on the second packet data route from the corresponding node, CN, contain a routing header field with an address of the mobile node, further comprising the step of:

for each data packet, adapting by the second local mobility anchor a header of the data packet by including the address of the mobile node in the routing header field as the destination address of the data packet and by deleting the routing header field, before forwarding the data packet to the first local mobility anchor.

12. The method of claim 1, further comprising the steps of:

in case route optimization is to be used for the first data packet route, determining whether the correspondent node is connected to the second local mobility anchor, in case the correspondent node is connected to the second local mobility anchor, instructing the second local mobility anchor to exchange the data packets with the mobile node and the correspondent node on the second data route via the second local mobility anchor, instead of instructing the correspondent node to exchange the data packets with the mobile node on the second data route via the second local mobility anchor, in case the correspondent node is not connected to the second local mobility anchor, determining whether the correspondent node is located in the second network area, wherein the step of instructing the correspondent node to exchange the data packets with the mobile node on a second data route via the second local mobility anchor is performed in case the correspondent node is not located in the second network area, in case the correspondent node is located in the second network area, determining a third local mobility anchor to which the correspondent node is connected in the second network area, upon determining the third local mobility anchor, instructing the second and third local mobility anchors to exchange the data packets with the mobile node and the correspondent node on a third data packet route via the second and third local mobility anchors, instead of instructing the correspondent node to exchange the data packets with the mobile node on a second data route via the second local mobility anchor.

13. A policy control entity in a first network area comprising:
- a processor configured to decide whether to use route optimization for a first data packet route on which data packets are to be exchanged between a mobile node and a correspondent node, wherein the decision is performed during or after establishing a connection of the mobile node to the correspondent node,
- a receiver configured to receive a request from a network entity, so as to request information about the decision for route optimization, and
- a transmitter configured to transmit the information about the decision for route optimization to the network entity,
- wherein the processor is further configured to establish at least one policy rule for the first data packet route, and is further configured to include information about the decision for route optimization in the at least one policy rule for the first data packet route.

14. A local mobility anchor for performing a route optimization, wherein a mobile node exchanges data packets with a correspondent node on a first data packet route via a first local mobility anchor in a first network area, and the connection of the mobile node is changed from the first local mobility anchor to the local mobility anchor, the local mobility anchor comprising:
- a processor configured to generate a request message for a policy control entity in the first network area, for requesting information on whether to use route optimization for the first data packet route between the correspondent node and the mobile node, and information on addresses of the correspondent node and the mobile node used for exchanging the data packets,
- a transmitter configured to transmit the request message to the policy control entity in the first network area after changing the connection of the mobile node from the first local mobility anchor to the local mobility anchor,
- a receiver configured to receive the requested information on whether to use route optimization and on addresses of the correspondent node and the mobile node,
- the processor is further configured to generate an instruction notification for the correspondent node to exchange the data packets with the mobile node on a second data route via the local mobility anchor in case route optimization is to be used for the first data packet route between the correspondent node and the mobile node, and
- the transmitter is further configured to transmit the instruction notification to the correspondent node,
- wherein the route optimization is performed by the local mobility anchor on behalf of the mobile node, by utilizing an address of the local mobility anchor as a care-of address of the mobile node, and by utilizing an address of the mobile node as a home address of the mobile node.

15. The local mobility anchor of claim 14, wherein
- the receiver is further configured to receive data packets from the correspondent node on the second data packet route, wherein the data packets contain a routing header field with an address of the mobile node,
- the processor is further configured to adapt a header of each received data packet by including the address of the mobile node in the routing header field as the destination address of each received data packet and by deleting the routing header field, and
- the transmitter is further configured to transmit each received data packet to the mobile node.

16. The local mobility anchor of claim 14, wherein
- the receiver is further configured to receive data packets from the mobile node on the second data packet route,
- the processor is further configured to adapt a header of each received data packet by including an address of the local mobility anchor as the source address of the data packet, and by including the address of the mobile node in an option field of the data packet.

* * * * *